March 27, 1956  J. E. DUFF  2,739,616
FLEXIBLE HOSE

Filed March 10, 1954  3 Sheets-Sheet 1

March 27, 1956

J. E. DUFF 2,739,616

FLEXIBLE HOSE

Filed March 10, 1954

March 27, 1956 J. E. DUFF 2,739,616
FLEXIBLE HOSE
Filed March 10, 1954 3 Sheets-Sheet 3

United States Patent Office 2,739,616
Patented Mar. 27, 1956

2,739,616

FLEXIBLE HOSE

Jack E. Duff, Canton, Ohio, assignor to The Hoover Company, North Canton, Ohio, a corporation of Ohio Application March 10, 1954, Serial No. 415,256

3 Claims. (Cl. 138—56)

The present invention relates to flexible hose and more particularly to a readily extensible flexible hose for use with suction cleaners either of the so-called tank type or with an upright cleaner for "off-the-floor" cleaning.

The hose of the present invention, comprises a single-thickness thermoplastic tube with a composite reinforcing element adhered to its walls either interiorly or exteriorly. The composite reinforcing element comprises a coiled reinforcing wire sheathed or coated with a thermoplastic material so as to be frictionally adherent to the walls of the thermoplastic tube.

According to the present invention, the hose is so made that the coils of the composite reinforcing element are substantially in contact with each other, separated only by the loops or folds in the walls of the thermoplastic tube.

According to the present invention, the composite reinforcing element is in the form of a sheathed or coated reinforcing wire cylindrically wound into a spiral coil so that the convolutions thereof are normally in substantial contact with each other. In one modification, the thermoplastic tube is applied exteriorly of the spirally coiled composite reinforcing element while the latter is in extended position whereby the hose is readily extensible in use.

In a second modification, the thermoplastic tube is applied interiorly of the spirally coiled composite reinforcing element while the latter is in extended position, which forms a hose which is also readily extensible.

In each modification, the composite reinforcing element is collapsed so as to form deep folds in the tube wall lying between the closely spaced convolutions of the composite reinforcing element, during or after which the hose is subjected to heat treatment while the tube wall is in its deeply corrugated position.

According to the present invention the reinforcing element is stretched, from its originally coiled condition with the coils or turns thereof in contact with each other to about two to four times its original length and the thermoplastic tube is assembled over the element while the latter is in its stretched condition. The thin-walled thermoplastic tube has an inside diameter less than that of the coiled reinforcing element whereby the walls of the tube will contract about the extended coils or turns to hold them in their extended position. In that condition the wall of the tube will tend to contract between the coils or turns of the reinforcing element and the reinforcing element will tend to contract to its original closely coiled position but will be held from doing so by the wall of the tube thus placing a stress on the tube wall.

When heat is applied, the material of the tube wall will soften and the stress will be relaxed so that the tube will assume its deeply corrugated position having an inwardly extending spiral fold with the walls thereof in contact with each other and in contact with the adjacent coils or turns of the reinforcing element. That will permit the reinforcing element to contract its maximum amount, the coils thereof being separated only by the walls of the fold.

After the hose has assumed its contracted condition due to the heat applied it is removed from the heat source and cooled to room temperature. The wall of the tube will then take a permanent set with the walls of the fold lying between and in contact with adjacent coils or turns of the reinforcing element.

Thus the hose of the present invention is ultra-flexible and also extensible since the deep folds in the tube wall need only be straightened out as the hose is flexed or extended without any stretching of the tube wall whatsoever.

The composite reinforcing element may be sheathed or coated in the manner disclosed and claimed in my copending application Serial No. 415,255, filed March 10, 1954.

Other objects and advantages of the present invention will become apparent as the description proceeds when taken in connection with the accompanying drawings in which Fig. 1 is a cross-sectional view of a preferred form of the hose of the present invention, with the composite reinforcing element positioned interiorly of the tube;

Figure 2:
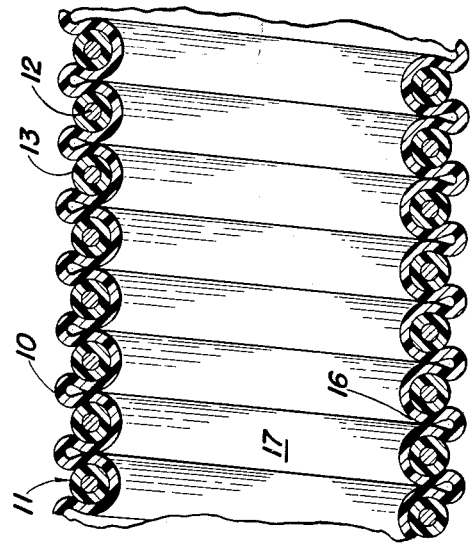
Fig. 2 is a cross-sectional view of a modification of the present invention, with the composite reinforcing element positioned exteriorly of the tube.
Figure 1:
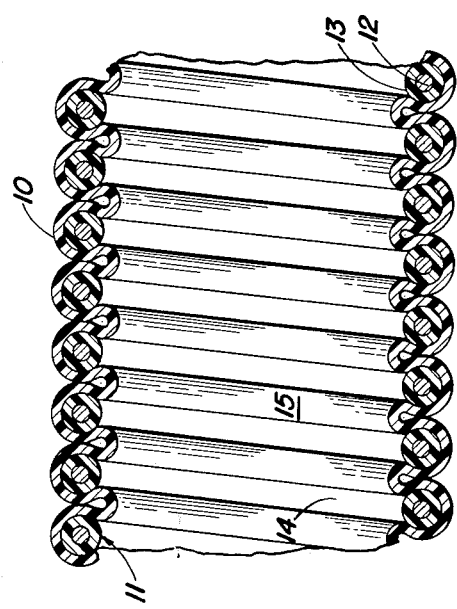

The hoses of Figs. 1 and 2 comprise a thermoplastic tube 10 and a composite reinforcing element 11. In Fig. 1 the composite reinforcing element 11 is positioned on the interior of the tube 10 while in Fig. 2 it is positioned on the exterior of the tube. The composite element 11 comprises a reinforcing wire 12 and a sheath or coating 13 of a thermoplastic material which may or may not be adhered to the thermoplastic tube 10.

In both Figs. 1 and 2 the tube 10 is deeply corrugated and the composite reinforcing element 11 is normally contracted so that its coils are in substantial contact, being separated only by the corrugated walls of the tube 10.

In Fig. 1 the tube 10 is formed interiorly, with deep valleys 14 forming a spiral recess in which the element 11 is positioned and with interior hills 15 the walls of which extend between the coils of the composite reinforcing element 11.

In Fig. 2 the tube 11 is formed with deep interior valleys 16 and hills 17, the coils of the composite reinforcing element 11 being positioned exteriorly in the convolutions formed by the hills 17 and being separated only by the walls of the tube 10 which form the interior valleys 16.

In each case the composite reinforcing element 11 is normally stressed to take a collapsed position with the coils or turns thereof in contact with each other and is easily extensible when the hose is flexed or elongated. The walls of the tube 10 forming the hills 15 of Fig. 1 and the valleys 16 in Fig. 2 will straighten out when the hose is stretched or flexed without interference from the composite reinforcing element 11. The foregoing feature renders the hose ultra-flexible and easily extensible, both features rendering the hose especially useful with suction cleaners.

In each modification the interior hills and valleys are of soft material which will not reflect sound waves so that objectionable whistling noises will not be produced as sometimes happens in other hoses.

In the modification of Fig. 1 the interior hills 15 are elongated when the hose is stretched. In collapsed position the inside diameter of the hose is approximately 1.39 inches, whereas in its fully extended position its inside diameter will be that of the composite reinforcing element 11, which is 1.45 inches.

In the modification of Fig. 2, the inside diameter of the hose will remain substantially constant whether the hose is in its collapsed or extended position.

In each modification the reinforcing wire 12 is preferably made of steel wire 0.058 inch in diameter and the sheath or coating 13 is approximately 0.010 inch in thickness, making the complete diameter of the composite reinforcing element 11, 0.078 inch. The tube 10 is preferably made of vinyl chloride, which is an elastomeric thermoplastic, having a wall thickness of 0.026 inch and a tensile strength of 2000 pounds per square inch at 80° F. The sheath 13 may be made of the same material as the tube.

The sheath 13 may be applied to the wire 12 in any suitable manner, for example by the method disclosed in my co-pending application Serial No. 415,255, filed March 10, 1954.

It is not essential that the composite reinforcing element 11 be bonded or adhered to the tube 10 since it will be effectively trapped in the deep corrugations formed in the tube 10. Additionally, since both the tube 10 or the sheath and coating 13 are made of thermoplastic material, sufficient frictional resistance will be present to prevent displacement of the element 11 from the corrugations of the tube 10.

The apparatus of Figs. 3 to 6, inclusive, may be used in assembling the hose of Fig. 1.

Figure 3:
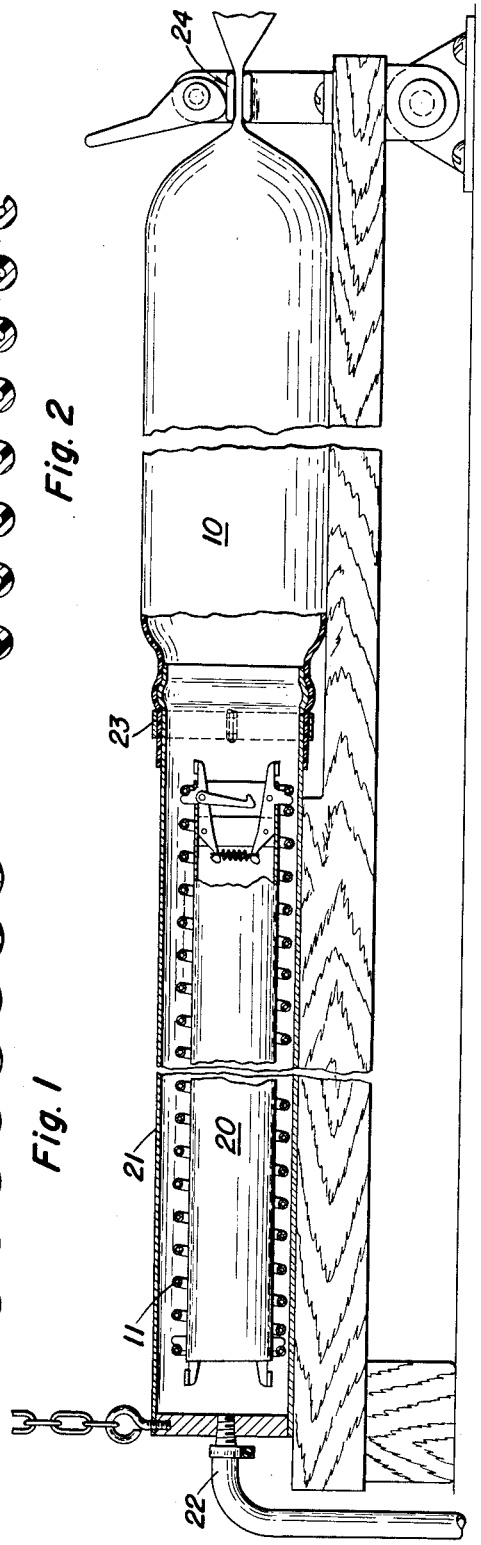
Figs. 3 and 4 show an apparatus by which the tube may be assembled about the exterior of a precoiled composite reinforcing element.

The precoiled composite reinforcing element 11 with its convolutions in contact with each other is placed on a mandrel 20 of smaller diameter than the coil 11 and stretched lengthwise to the position shown in Fig. 3 to separate the coils a substantial distance apart, the coil being stretched to at least two to four times its original length, suitable clamps being provided at the ends of the mandrel 20 to hold the coil 11 in extended position.

If found necessary the mandrel 20 may be vibrated so that the turns or coils of the reinforcing element 11 are evenly spaced apart. It has been found, however, that even without vibration the coils will be substantially evenly spaced due to the tendency of the element 11 to return to its original position with the turns or coils in contact with each other.

Figure 4:
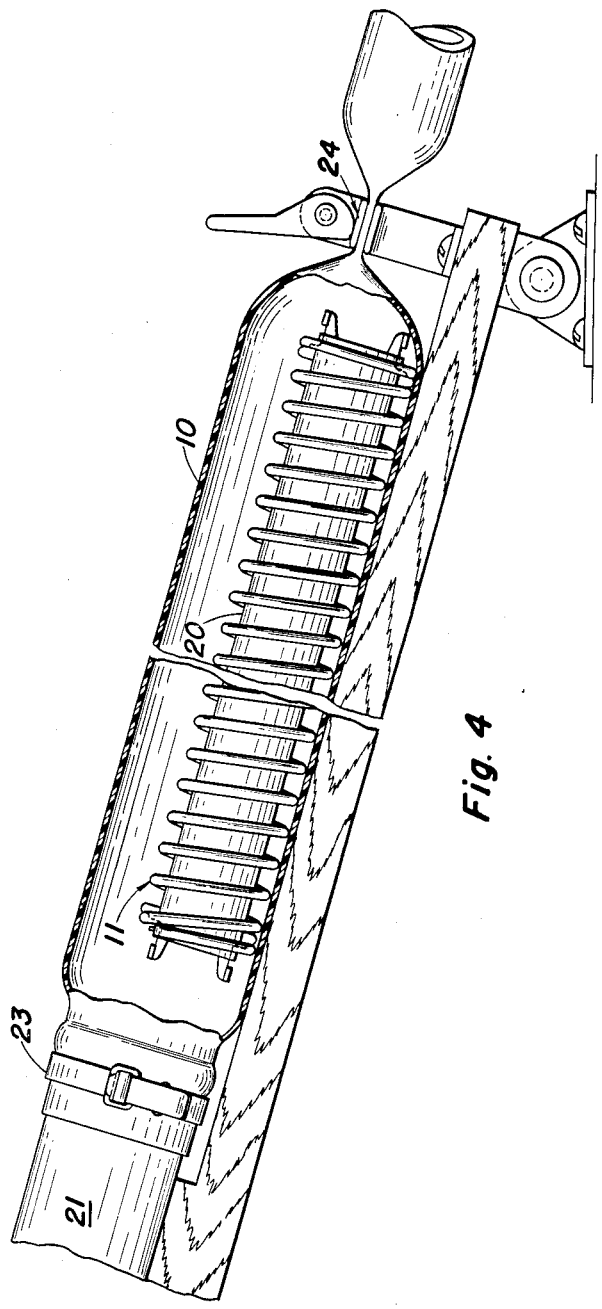

The mandrel 20 with the extended coil 11 thereon is then placed in a rigid pipe 21 having an air hose 22 leading to its interior. The open end of a length of tubing 10 is clamped to the open end of the pipe 21 by means of a clamp 23, the opposite end of the tube 10 being closed by a clamp 24 shown in Fig. 4. Air under pressure is then applied to the hose 22 to inflate the tube 10 and the pipe tilted as shown in Fig. 4 so that the mandrel 20 with the coil 11 thereon slides into the expanded section of tube 10 as shown in Fig. 4.

Figure 5:
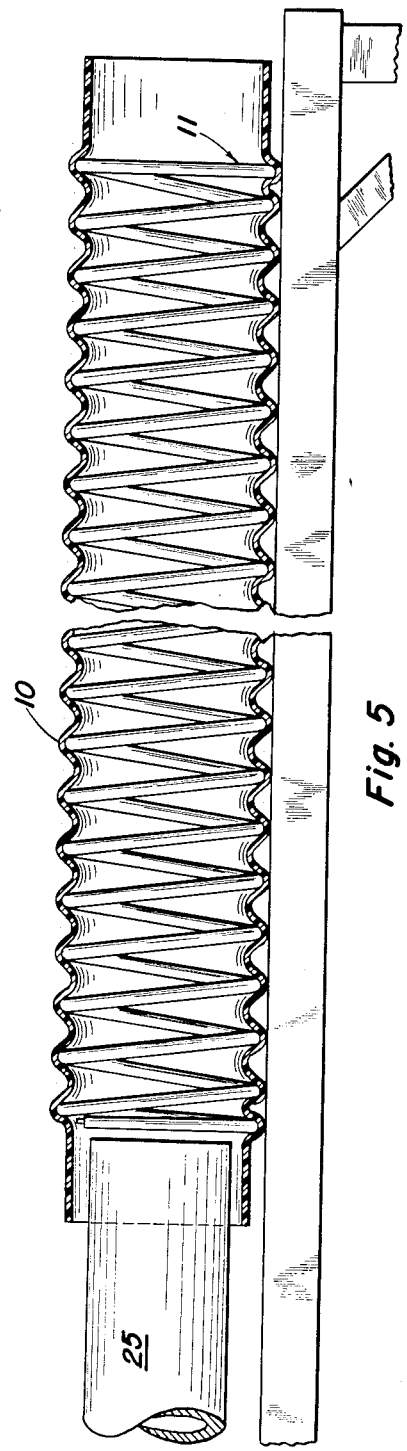
Fig. 5 shows one method by which the tube may be adhered to the composite reinforcing element if that is found desirable.

The air pressure is then released and the tube 10 severed at the clamp 24, whereby the tube 10 and coil 11 will assume the position shown in Fig. 5, the inside diameter of the tube being less than the inside diameter of the coil 11.

When the air pressure is released from the tube 10 it will tend to return to its original diameter and the coil 11 will tend to return to its original length with the turns or coils in juxtaposed physical contact with each other. The tube 10 will be prevented from returning to its original diameter by the coil 11 and its walls will contract between the turns of the coil 11 so as to lie between adjacent turns and thus hold the turns in their evenly spaced relationship as shown in Fig. 5. The element 11 will be prevented from returning to its original length by the walls of the tube 10 which will place a stress on the tube walls.

If it is desired to bond the composite coil 11 to the tube 10, a suitable solvent is placed in the interior of the tube 10 and the latter rotated to distribute the solvent while warm air is supplied by pipe 25 to evaporate any excess solvent. As previously stated, it is not essential that the coil 11 be bonded to the tube 10.

Figure 6:
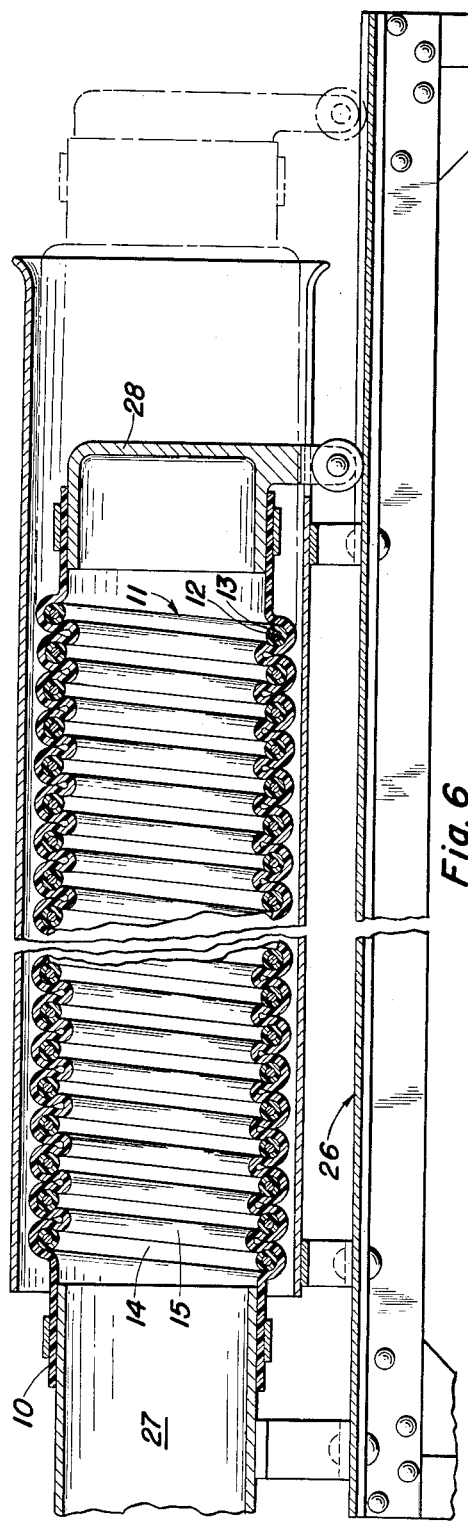
Fig. 6 shows an apparatus and method by which the hose of Fig. 1 may be deeply corrugated.

The tube 10 and the encased coil 11 is then placed in the apparatus 26 shown in Fig. 6, one end of the tube 10 being clamped to a suction pipe 27 and the other to a movable carriage 28 and suction applied while the tube and coil is being heated to a temperature of about 180° F. The heat applied to the tube 10 will soften its wall and relax the stress therein with the result that the combined action of the suction applied and the tendency of the coil 11 to return to its original unstretched condition will cause the hose to assume the position shown in Fig. 1 with the walls of the folds 15 lying in contact with each other and in contact with the adjacent turns of the coil 11 and with the fold 15 extending inwardly substantially beyond the inner periphery of the coil 11. The application of heat is then stopped and the hose permitted to cool to room temperature whereby the wall of the hose will take a permanent set in a position shown in Fig. 1 with the turns of the coil 11 lying within the inwardly facing spiral valley 14 and closely embraced by the wall of tube 10. If a solvent was previously applied, the coil 11 will be bonded to the tube 10 in the valleys 14. If no solvent was applied, the convolutions of coil 11 will be effectively trapped in the deep valleys or corrugations 14.

While the hose is still warm, it may be stretched to break any adhesions which may have occurred between adjacent corrugations.

Figure 7:
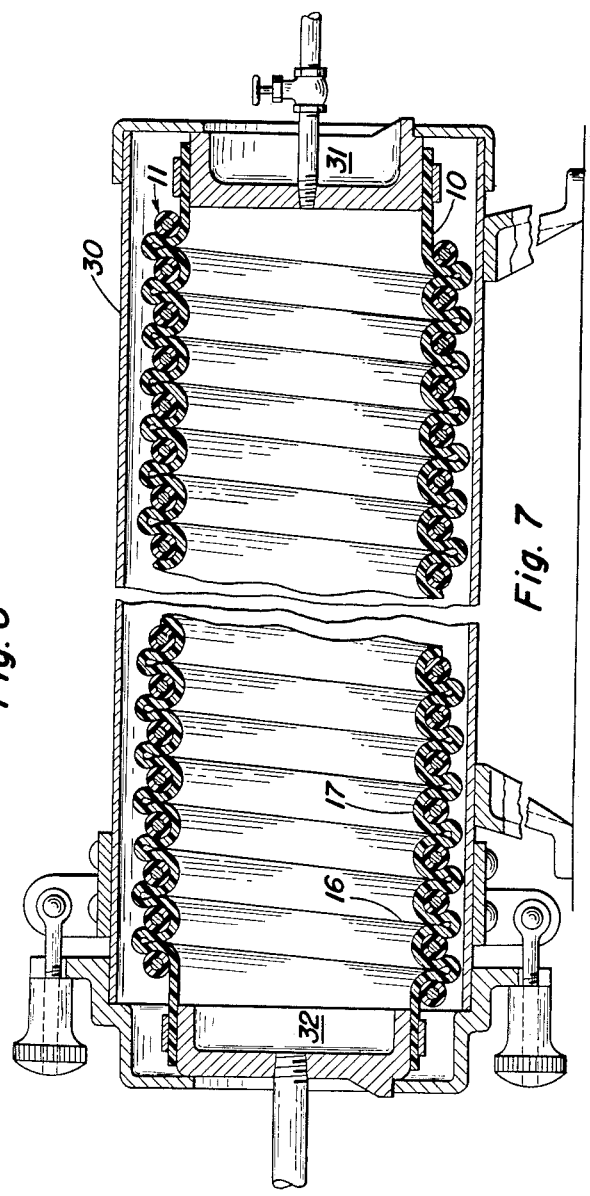
Fig. 7 shows an apparatus by which the hose of Fig. 2 may be deeply corrugated.

The hose of Fig. 2 may be made by the apparatus shown in Fig. 7. The precoiled and presheathed composite reinforcing coil 11 is placed exteriorly of the tube 10 and the assembly placed within the steel pipe 30, one end of the tube 10 being clamped to the head 31 by which air under pressure may be applied, and its other end being clamped to the head 32 through which hot air or steam may be applied. The air under pressure will cause the walls of the tube 10 to be forced between the coils of the element 11 to form the deep interior valleys 16 shown in Fig. 2 whereby the coils of the element 11 are effectively trapped between adjacent valleys 16, the coils being separated only by the two walls of the corrugations. The warm air or steam will soften the walls of the tube 10 to relax the stress therein so that it will remain in the position shown after the air pressure is released. The air pressure and the supply of warm air or steam is shut off and the hose permitted to cool. The wall of the tube 10 will take the permanent set position shown in Fig. 2 with the turns of the coil 11 embraced and trapped in the outwardly facing valley formed by the inwardly extending hill 17, it being noted that the spiral fold formed by the spiral valley 16 extends outwardly beyond the outer periphery of coil 11.

In each of the modifications, the tube wall is formed with deep corrugations in which the coils of the composite reinforcing element 11 are effectively trapped, the coils being separated only by the walls of the tube which form the corrugations.

In each modification, the finished hose is readily extensible since it is only necessary that the corrugations of the tube wall be straightened out in order to extend the finished hose, there being no necessity for placing the walls of the hose under a tensile stress as in previous constructions.

In each modification, the composite reinforcing element 11 is effectively trapped in the corrugations of the tube 10, whether or not the former is bonded to the latter, because the frictional resistance between the sheath 13 and the tube 10 will prevent displacement of the coils of the composite reinforcing element 11 from their proper corrugations.

While I have shown and described but two embodiments of my invention, it is to be understood that those embodiments are to be taken as illustrative only and not in a limiting sense. I do not wish to be limited to the particular structures shown and described but wish to include all equivalent variations thereof, except as limited by the scope of the claims.

I claim:

1. A flexible extensible hose for use with a suction cleaner consisting of a cylindrical spirally wound wire coil prestressed so that its turns normally tend to lie in substantial contact with each other when free to do so and a thin walled tube of an elastomeric thermoplastic material embracing the turns of said coil, said tube when the hose is in its normal static contracted condition having alternate inwardly and outwardly facing spiral folds with said inwardly facing fold embracing the turns of said coil and with said outwardly facing fold lying between the turns of said coil in the form of loop portions inwardly of the turns of said coil, said loop portions being substantially closed with the walls thereof inwardly of the turns of said coil shaped to form slack material which may be unfolded to a degree without increasing the internal diameter of the trough of said loop portions when the hose is extended and without lengthening the material of the wall of said tube.

2. A flexible extensible hose according to claim 1 in which said coil comprises a metallic wire sheathed within a thin covering of an elastomeric thermoplastic material.

3. A flexible extensible hose according to claim 1 in which the turns of said coil are unbonded to the tube wall forming said inwardly facing fold.

References Cited in the file of this patent

UNITED STATES PATENTS

| | | |
|---|---|---|
| 713,560 | Dodge | Nov. 11, 1902 |
| 2,385,389 | Toepper et al. | Sept. 25, 1945 |
| 2,430,081 | Roberts et al. | Nov. 4, 1947 |
| 2,516,864 | Gilmore et al. | Aug. 1, 1950 |
| 2,560,369 | Roberts | July 10, 1951 |
| 2,609,002 | Meissner | Sept. 2, 1952 |
| 2,641,302 | Martin et al. | June 9, 1953 |
| 2,661,025 | Brace | Dec. 1, 1953 |